Jan. 4, 1927.
W. MAUSS
1,612,873
ROTARY VACUUM FILTER
Filed Jan. 14, 1924     4 Sheets-Sheet 1
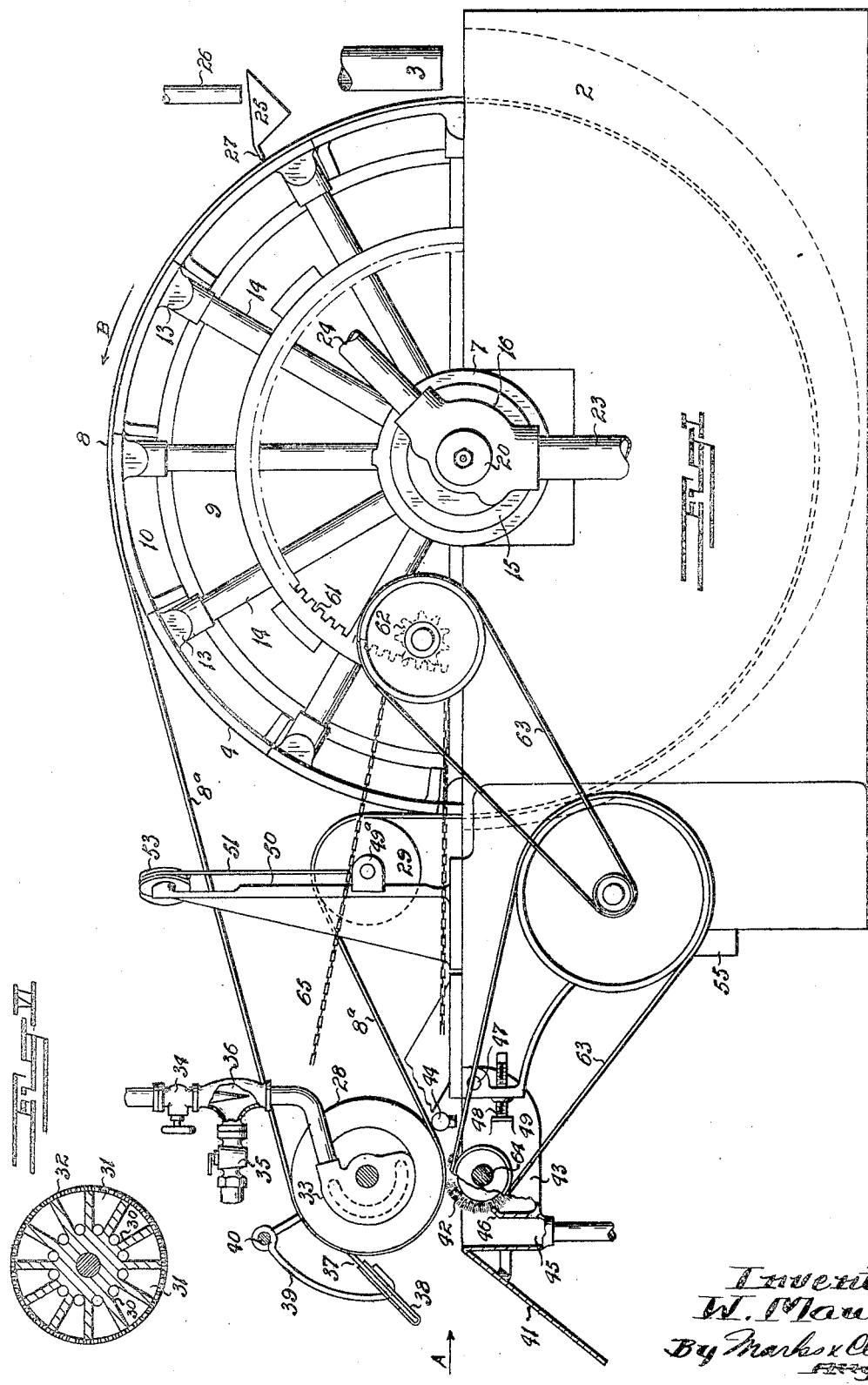
Inventor
W. Mauss
By Marks & Clerk
Attys.

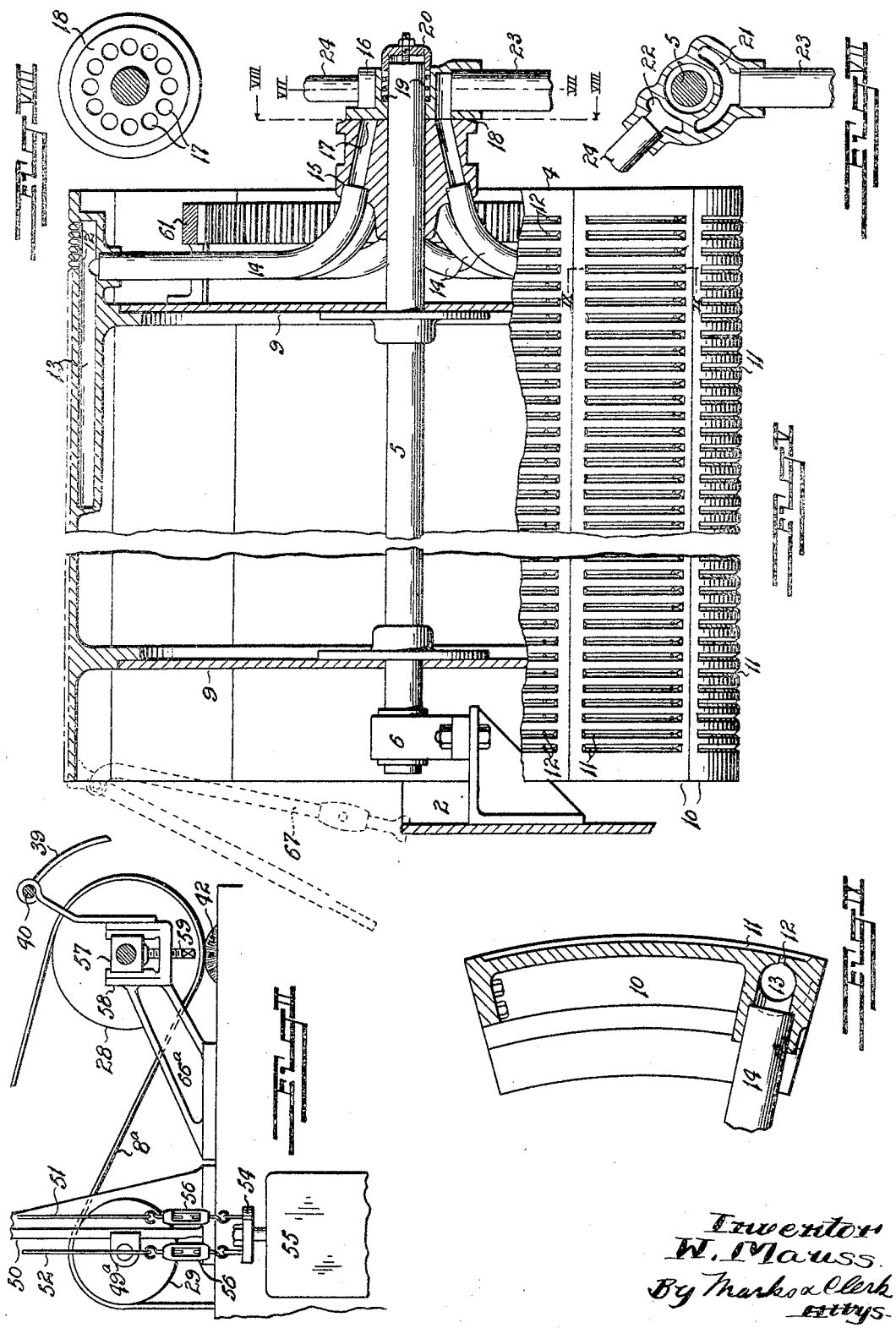

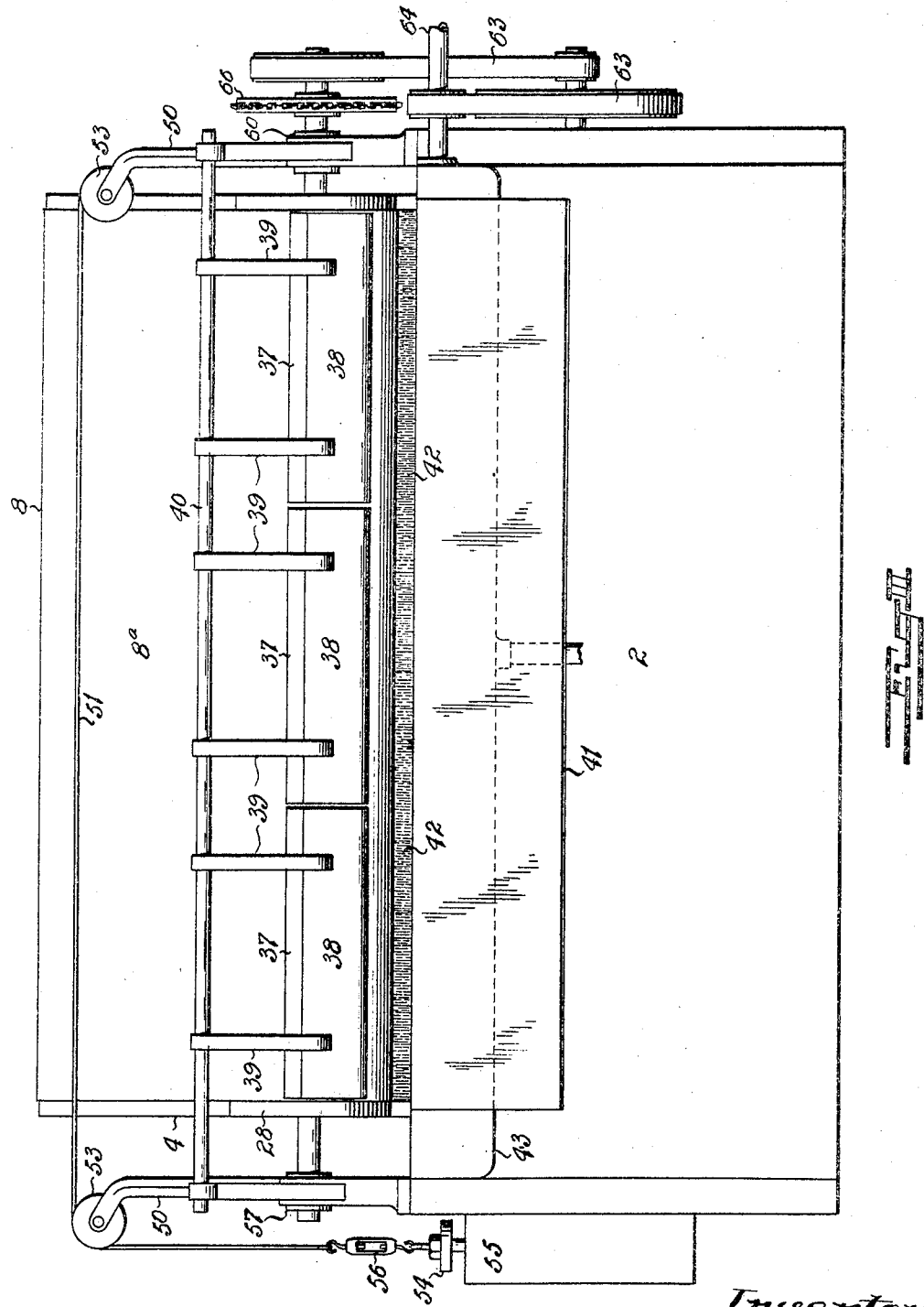

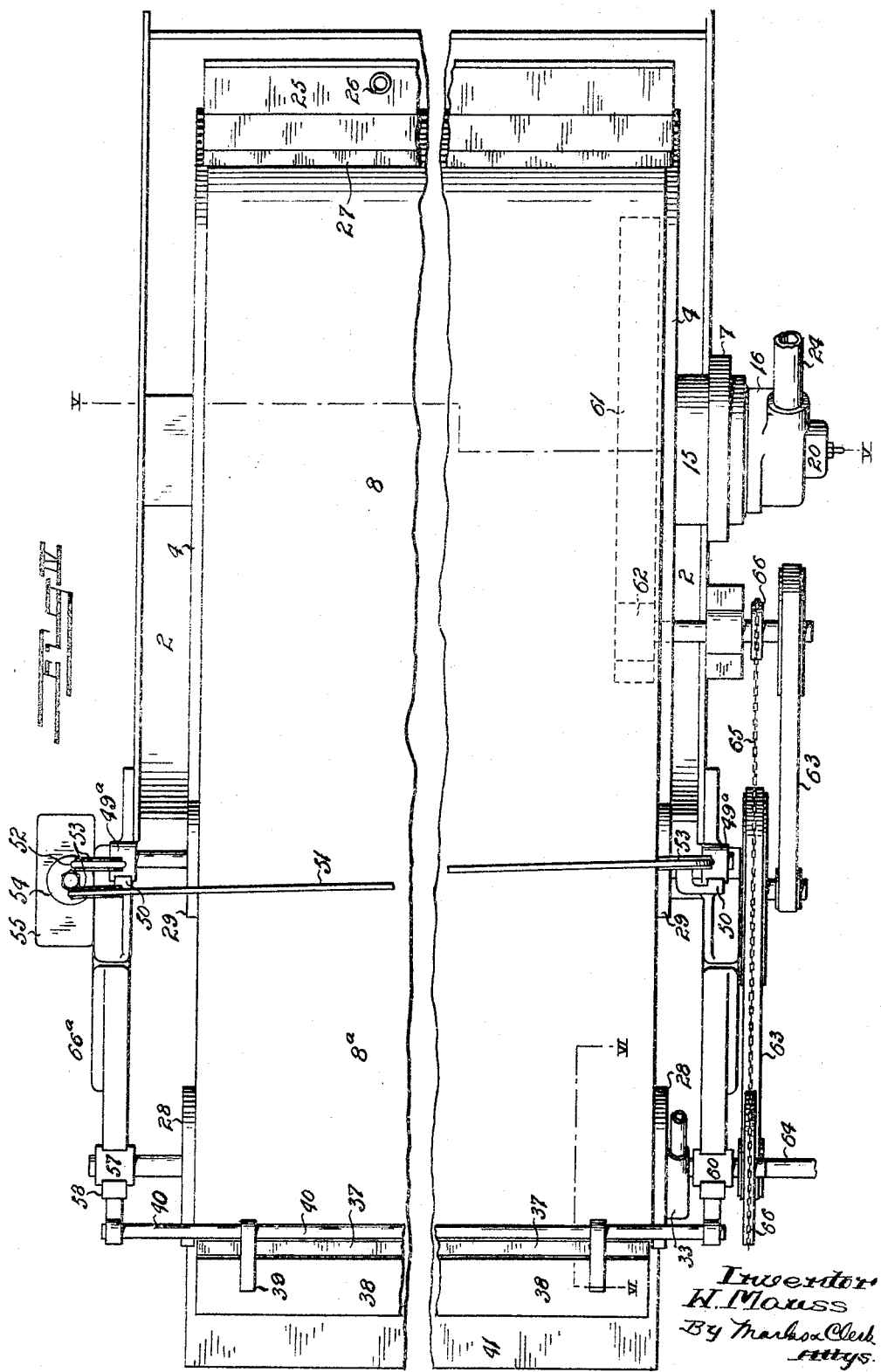

Patented Jan. 4, 1927.

1,612,873

UNITED STATES PATENT OFFICE.

WILHELM MAUSS, OF DURBAN, NATAL, SOUTH AFRICA.

ROTARY VACUUM FILTER.

Application filed January 14, 1924. Serial No. 686,179.

The present invention provided a rotary vacuum filter constructed specially with the object of effecting thorough and continuous cleaning of the filter cloth, so enabling the apparatus to be used successfully for filtering material which rapidly clogs the filter cloth.

The invention is illustrated in the accompanying drawings in which—

Fig. I is an end elevation.

Fig. II is an elevation of part of the opposite end.

Fig. III is a side elevation seen from the direction of arrow A Fig. I.

Fig. IV is a plan.

Fig. V is a section of the drum taken on V—V, Fig. IV.

Fig. VI is a section on VI—VI, Fig. IV.

Fig. VII is a section on VII—VII, Fig. V.

Fig. VIII is a section on VIII—VIII, Fig. V.

Fig. IX is an enlarged section on IX—IX, Fig. V.

2 indicates a tank to which the filtrant is supplied by a pipe 3. The rotary drum 4 is carried on a horizontal shaft 5 mounted in bearings 6, 7 so that the drum is about half submerged in the filament. The special feature of the invention is that the filter cloth 8 is not fixed to the drum, but is made in the form of an endless belt which is lapped about part of the periphery of the drum and moves therewith as indicated by the arrow B Fig. I. A part 8ª of the cloth is looped away from the drum and the cleaning of the filter cloth is effected while it is in this loop.

The drum consists of end plates 9 and a cylindrical shell built up of a number of segments 10 bolted together. For collecting filtrate, each segment is formed on its outer surface with circumferential grooves 11 spaced from the edges of the segment. Each groove is connected by a small hole 12 to a longitudinal pipe 13 from which a pipe 14 leads to the valve 15, 16. The longitudinal pipe 13 is arranged at the edge of each segment which is lowest on the rising side of the drum, to ensure complete drainage of each segment after it rises out of the filtrant.

The several pipes 14 lead to corresponding ports 17 in the face 18 of the valve member 15 which rotates with the drum. Cooperating with such rotating member is a fixed valve member 16 which is pressed against the face 18 by the spring 19 interposed between it and the annular cap 20 fixed to the shaft. In the member 16 are formed the arcuate ports 21, 22 which register with all the ports 17 in turn, and communicating with the respective suction pipes 23, 24 connected to exhausting apparatus not illustrated. Said pipes 23, 24 also serve to hold the valve member 16 from rotation. The angular extent of the port 21 is such as to put under vacuum all the drum sections which are at any moment in the lower half of the drum; causing the liquid in the tank 2 to pass through the cloth and precipitate to be deposited on the cloth. The angular extent of the port 22 is such as to maintain vacuum on the segments after they emerge from the tank 2 and until they reach the position where the cloth leaves the drum. For washing the deposit on this part of the drum there is provided a trough 25, fed from a pipe 26 and discharging a sheet of wash liquid over its lip 27.

The loop of the cloth 8ª passes from the top of the drum to a cylinder 28 of considerably less diameter than the drum, and thence over a tensioning roller 29 back to the drum. In this way the cloth is flexed and this has an important effect in loosening the deposit and keeping the interstices of the cloth clean.

Different methods of cleaning the cloth may be used according to the nature of the material being filtered. The apparatus shown is intended particularly for the separation from mechanically clean sugar juice of light flocculent albuminous matter containing gums and the chemicals by which the juice has been tempered. A cleaning arrangement suitable for the removal of such matter and many other precipitates, employs, in addition to the flexing of the cloth as above mentioned, reverse flow of fluid through the cloth, heating, scraping and brushing.

The cylinder 28 is hollow, and its shell 32 is perforated. Internally it is divided by longitudinal radial partitions 30 into a number of separate segmental chambers 31. The cylinder is fitted with a rotary valve 33, similar to the drum valve 15, 16 and such that the part of the cylinder which is lapped by the cloth may be supplied with pressure fluid for discharge through the shell under the cloth. A supply of steam for this purpose is controlled by a valve 34 and air in regulated proportions is admitted through a cock 35 and mixed with the steam in an ejector device 36. The flexing of the cloth and the flow of steam and air from the inside to the outside thereof brings the deposit to the outer surface of the cloth so that the greater part of it can be removed by scrapers. These consist of rubber strips 37 slipped into the metal frames 38 which are suspended by arms 39 from a supporting shaft 40 so that their weight causes them to press lightly on the cloth. The material removed by the scrapers is discharged by way of a chute 41.

After passing the scrapers the cloth continues to move around the surface of the cylinder, still having fluid blown through it, and reaches the brush 42 revolving oppositely to the cylinder 28. Since the deposit has already been loosened from the interstices of the cloth and brought to or near to the surface thereof, a soft brush can be used which does not injure the cloth. For the purpose of keeping the brush clean it is partly immersed in water in a trough 43. Fresh water is constantly supplied by pipes 44 to several points of the troughs and flows away by an overflow 45 having a lip 46 which penetrates and cleans the brush as the latter leaves the cloth. The overflow water passes up through the brush bristles to reach the overflow lip and so assists the latter to clean the bristles. The brush is adjusted into proper contact with the cloth by hinging the trough 43 at 47 and providing an adjusting screw 48 engaging a lug 49 whereby the trough can be raised and lowered.

The fact that the cloth is subjected to internal fluid pressure whilst being scraped and brushed not only assists the removal of deposit by these operations, but, owing to the pressure keeping the cloth floating on the drum, prevents the scrapers and brush from crumpling the cloth.

Although the cloth moves similarly to a machine belt it behaves differently from such a belt because it has no stiffness, and special precautions are necessary to cause it to maintain its proper position on the drum. To this end means are provided for accurately adjusting the tension over its width and for accurately feeding it onto the drum. The bearings 49ª of the tensioning roller 29 rest against vertical guides 50 which allow them to rise and fall. The pressures exerted by the roller at the two edges of the cloth are relatively adjustable and for this purpose cords 51 and 52 are connected separately to the bearings 49ª and carried by means of guide pulleys 53 to a yoke 54 to which is attached a single tensioning weight 55. By means of the turn buckles 56 in the cords the weight 55 can be distributed in any desired proportion between the cords.

If the tension at one edge of the cloth is greater than that at the other edge, the edge under the greater tension will stretch more than the other. In passing around the drum and through the loop the stretched edge will accordingly lag behind the unstretched edge, resulting in a cumulative bias of the cloth. This would be indicated for instance by the cloth joint coming into a diagonal position; and when this tendency is seen, the turn buckles 56 are adjusted to relieve the tension on the stretched edge and increase the tension on the unstretched edge, so correcting the error.

Again, to the extent to which the cloth is not fed squarely to the drum it will gradually creep along the drum towards one or other end. To correct this the cylinder 28 is so arranged that its axis may be angularly adjusted with regard to the axis of the drum. The bearing 57 for one end of the cylinder is arranged in a guide 58 wherein it can be adjusted by means of a set screw 59, so altering the angle at which the cloth is presented to the drum. The adjustment thus required being very small, the bearing 60 at the other end of the drum need not be specially modified to allow for it.

It will be observed that the drum surface is grooved only in the circumferential direction and transverse grooving is avoided. The reason is that the filtering pressure forces the cloth into the grooves and so stretches it transversely to the grooves. With circumferential grooves this simply results in a variation of the width of the cloth; but if transverse grooves were present, the central area of the cloth which comes in contact with the grooves would stretch as compared with the edges of the cloth which pass over the ungrooved ends of the drum and the cloth would be uneven.

For driving the drum there is provided an internal gear wheel 61 secured to one of the end plates 9. Said internal gear wheel is driven by a pinion 62 and the reducing belt drive 63 from the brush shaft 64 which is itself driven from any suitable source of power. The cylinder 28 is driven positively with the pinion 62 by means of the chain 65 and sprockets 66.

To allow for the cloth being removed and replaced the plummer block 6 supporting the drum shaft and the bracket 66ª supporting the end bearing 57 for the cylinder 28, are made removable. The procedure is that the weight 55 is jacked up so allowing the tension roller 29 to fall and loosen the cloth. The drum shell is supported from the tank wall by such means as a jack 67 (Fig. V) and the plummer block 6 is removed, when the cloth can be drawn around the adjacent end of the drum. The plummer block is replaced, the jack 67 removed and the cloth is withdrawn entirely from the drum. The cloth on the cylinder 28 is then bunched up to the end of the same near the bracket 66ª, the cylinder is temporarily supported, the bracket 66ª removed, and the cloth slipped clear from the cylinder and withdrawn past the weight 55. In replacing the cloth the operation is reversed.

In operating the filter, the cloth 8 having been placed about the drum 4 the cylinder 28 and the tension roller 29, the tank 2 is charged with the liquid to be filtered, vacuum is produced in the pipes 23, 24 and the drum is set in rotation. The drum segments for the time being at the lower half of the drum are put under vacuum through the valve 15, 16 and pipe 23. Clear liquid is sucked through the cloth and the solid matter is deposited on the surface thereof. Suction is continued in the drum sections after they have emerged from the liquid, and wash liquid (if required) is then applied to the outside of the cloth at this point whereby it is forced through the deposit and conveyed away by the pipe 24. Suction ceases at the section about the top point of the drum. The cloth carrying the solid deposit then passes off the drum to the cleaning devices above described and afterwards rejoins the drum in a clean state ready for further filtering. If the cloth joint does not keep square with the drum, adjustment of the turn buckles 56 is made to restore it to its proper position; and whenever the cloth fails to keep its proper position longitudinally of the drum the set screw 59 is adjusted to correct it.

Each time the cloth returns to the drum, it takes up a different position in regard to the grooves 11 so that in a period of time every part of its area, except the extreme edges, is subjected to exactly the same suction action and flexing into the grooves. Similarly every part of it is equally cleaned; and the cloth is thus kept in a more efficient state than a cloth fixed to the drum, different local areas of which are more and less favourably situated for filtering and cleaning.

I claim:

1. In a vacuum filter, a rotary drum, a filter cloth lapped beltwise about the same and looped therefrom, and means for cleaning the cloth in the loop comprising a rotary brush contacting with the surface of the cloth, a tank adapted to contain liquid in which the brush is partly immersed, means for supplying liquid to the tank, and an overflow lip over which surplus liquid passes from the tank, said overflow lip being formed as a scraper and penetrating the brush.

2. In a vacuum filter, a rotary filter drum, a filter cloth lapped beltwise about the same and looped away therefrom, a roller applying tension to the cloth in the loop, the ends of the roller being relatively movable, means connecting said ends severally to a common force-exerting means, and adjustments for distributing the force adjustably to said connecting means.

3. In a vacuum filter, a rotary filter drum, a filter cloth lapped beltwise about the same and looped away therefrom, and cleaning means operating on the cloth in the loop comprising a perforated cylinder about which the cloth is lapped, a rotating brush operating upon the exterior of the cloth in contact with the cylinder, means for constantly wetting the brush, and means for supplying steam to the interior of the drum and then passing it through the cloth whereby it is condensed in the interstices thereof by the water on the brush.

4. In a vacuum filter, the combination of a rotatable drum, a filter cloth lapped beltwise about the drum and looped away therefrom, roller means engaging the cloth in the loop to apply longitudinal tension thereto, the drum being grooved on the surface and perforated, means for exhausting the drum within the part of its periphery covered by the cloth whereby material is forced through the cloth and through said grooves and perforations, the grooves of the drum extending wholly circumferentially whereby the tensioning of the cloth is not affected by the depression of the cloth into the grooves.

In testimony whereof I affix my signature.

WILHELM MAUSS.